(12) United States Patent
Goshen et al.

(10) Patent No.: US 10,169,848 B2
(45) Date of Patent: Jan. 1, 2019

(54) RESTORATION OF LOW CONTRAST STRUCTURE IN DE-NOISE IMAGE DATA

(71) Applicant: KONINKLIJKE PHILIPS N.V., Eindhoven (NL)

(72) Inventors: Liran Goshen, Pardes-Hanna (IL); Asher Gringauz, Nesher (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 34 days.

(21) Appl. No.: 15/302,254

(22) PCT Filed: Apr. 14, 2015

(86) PCT No.: PCT/IB2015/052686
§ 371 (c)(1),
(2) Date: Oct. 6, 2016

(87) PCT Pub. No.: WO2015/162519
PCT Pub. Date: Oct. 29, 2015

(65) Prior Publication Data
US 2017/0039685 A1    Feb. 9, 2017

Related U.S. Application Data

(60) Provisional application No. 61/983,063, filed on Apr. 23, 2014.

(51) Int. Cl.
*G06T 5/00*    (2006.01)

(52) U.S. Cl.
CPC .... *G06T 5/002* (2013.01); *G06T 2207/10004* (2013.01); *G06T 2207/10072* (2013.01);
(Continued)

(58) Field of Classification Search
CPC ......... G06T 5/002; G06T 5/005; G06T 5/006; G06T 2207/20182; G06K 9/40; H04N 5/217–5/2178; H04N 5/357–5/3675
(Continued)

(56) References Cited

U.S. PATENT DOCUMENTS 9,111,336 B2 * 8/2015 Tian ..................... G06T 5/002
9,161,734 B2 * 10/2015 Vincent ................. A61B 5/055
(Continued)

FOREIGN PATENT DOCUMENTS

CN    103034989    4/2013
CN    103295195    9/2013
(Continued)

OTHER PUBLICATIONS

Tomasi et al., "Bilateral Filtering for Gray and Color Images," ICCV '98.
(Continued)

*Primary Examiner* — Bobbak Safaipour (57) ABSTRACT

A method includes obtaining original image data and obtaining de-noised image data, wherein the de-noised image data is the original image data after de-noising the original image data. The method further includes determining a noise pattern for the original image data. The method further includes estimating underlying local structure from the original image data based on the noise pattern. The method further includes restoring low contrast structure that is lost during the de-noising of the original image data to the de-noised image data based on the estimated underlying local structure by adding the estimated underlying local structure to the de-noise imaged data, generating low contrast structure enhanced de-noised image data.

15 Claims, 6 Drawing Sheets

(52) U.S. Cl.
CPC ............... *G06T 2207/20028* (2013.01); *G06T 2207/30004* (2013.01)

(58) Field of Classification Search
USPC .......................... 348/241–251; 382/274, 275
See application file for complete search history.

(56) References Cited

U.S. PATENT DOCUMENTS

| | | | | |
|---|---|---|---|---|
| 9,330,443 | B1* | 5/2016 | Zou | G06T 5/002 |
| 9,547,889 | B2* | 1/2017 | Goshen | G06T 5/002 |
| 9,818,177 | B2* | 11/2017 | Suzuki | A61B 5/1171 |
| 2006/0015252 | A1* | 1/2006 | Yamamoto | G01S 17/936 |
| | | | | 701/301 |
| 2008/0037899 | A1* | 2/2008 | Xu | H04N 1/3872 |
| | | | | 382/276 |
| 2011/0268328 | A1 | 11/2011 | Bar-Aviv | |
| 2012/0106815 | A1 | 5/2012 | Yang | |
| 2012/0224760 | A1 | 9/2012 | Goshen | |
| 2013/0071024 | A1 | 3/2013 | Jang | |
| 2017/0372461 | A1* | 12/2017 | Kim | G06T 5/009 |

FOREIGN PATENT DOCUMENTS

| | | |
|---|---|---|
| WO | 2010/073251 | 7/2010 |
| WO | 2012131520 | 10/2012 |
| WO | 2013076613 | 5/2013 |

OTHER PUBLICATIONS

Perona et al., "Scale-space and edge detection using anisotropic diffusion," IEEE PAMI '90.

Rudin et al., "Nonlinear total variation based noise removal algorithms," Physica D 60 (1992) 259-268.

Comaniciu et al., "Mean shift: a robust approach toward feature space analysis," IEEE PAMI 2002.

Alvarez et al., "Energy selective reconstructions in X-ray computerized tomography", Phys. Med. Biol. 21, pp. 733-744 (1976).

Wunderlich et al., "Image Covariance and Lesion Detectability in Direct Fan-Beam X-Ray Computed Tomography", Phys. Med. Biol. 53 (2008), 2472-2493.

Brunet, et al., "The Use of Residuals in Image Denoising", Jul. 6, 2009.

Jin, et al., "Adaptive wiener filtering of noisy images and image sequences", Proceedings 2003 International Conference on Image Processing.

Zhang, et al., "Multiresolution Bilateral Filtering for Image Denoising", IEEE Transactions on Image Processing, vol. 17, No. 12, Dec. 1, 2008.

Manhart, et al., "Guided noise reduction with streak removal for high speed flat detector CT perfusion", 2013 IEEE Nuclear Science Symposium and Medical Imaging Conference.

Ma, et al., "Low-dose computed tomography image restoration using previous normal-dose scan", Med. Phys. 38 (10), Oct. 2011.

\* cited by examiner

RESTORATION OF LOW CONTRAST STRUCTURE IN DE-NOISE IMAGE DATA

CROSS REFERENCE TO RELATED APPLICATIONS

This application is the U.S. National Phase application under 35 U.S.C. § 371 of International Application No. PCT/IB2015/052686, filed Apr. 14, 2015, published as WO 2015/162519 on Oct. 29, 2015, which claims the benefit of U.S. Provisional Patent Application No. 61/983,063 filed Apr. 23, 2014. These applications are hereby incorporated by reference herein.

The following generally relates to imaging processing and more particularly to restoring low contrast structure to de-noised image data, and is described with particular application to computed tomography (CT). However, the following is also amenable to other imaging modalities.

Multi-energy (spectral) CT utilizes multiple attenuation values acquired simultaneously at multiple different photon energies to solve the photoelectric effect, Compton scattering, and other component(s) (e.g., K-edge) contributions of the mass attenuation coefficient of a material. There are several approaches to perform multiple energy CT acquisition such as multiple-source, fast kVp switching, and multiple-layer detector configuration. The basis material images can be used to generate a monochromatic image, a material cancellation image, an effective atomic number image and an electron density image. Dual-energy imaging is well-suited with materials such as iodine that have a K-edge energy close to a mean value of a diagnostic energy range. Because any two linearly independent sums of two basis functions span the entire attenuation coefficient space, any material can be represented by a linear combination of two other materials, generally referred to as basis materials, such as water and iodine.

However, multi-energy CT suffers from an inherent noise, especially in scenarios in which a material decomposition is conducted, as the decomposition amplifies the noise significantly, where the obtained noise is highly anti-correlated between the materials. If images are directly reconstructed from the material line integrals, they are very noisy. As a result, the obtained image quality is low, which reduces its clinical value considerably. Several methods have been proposed to remove the noise and recover the true image data. These methods include, but are not limited to, Tomasi et al., "Bilateral Filtering for Gray and Color Images," ICCV '98; Perona et al., "Scale-space and edge detection using anisotropic diffusion," IEEE PAMI '90; Rudin et al., "Nonlinear total variation based noise removal algorithms," Physica D 60 (1992) 259-268, and Comaniciu et al., "Mean shift: a robust approach toward feature space analysis," IEEE PAN/TI 2002.

Although the above noise reduction approaches, as well as other noise reduction approaches, reduce noise, unfortunately, they also tend to degrade the low contrast structures, and low contrast structures often are important, for example, for clinical diagnosis such as liver lesions and myocardial perfusion deficit, image quality enhancement, dose reduction, etc.

Aspects described herein address the above-referenced problems and others.

The following describes an approach that restores low contrast structure to de-noised image data. The restoration includes processing the original image data to determine a noise pattern for the original image data and to identify low contrast structure in the original image data using the noise pattern. The identified low contrast structure is then restored to the de-noised original image data, producing subsequent de-noised image data in which the underline low contrast structures are better preserved.

In one aspect, a method includes obtaining original image data and obtaining de-noised image data, wherein the de-noised image data is the original image data after de-noising the original image data. The method further includes determining a noise pattern for the original image data. The method further includes estimating underlying local structure from the original image data based on the noise pattern. The method further includes restoring low contrast structure that is lost during the de-noising of the original image data to the de-noised image data based on the estimated underlying local structure by adding the estimated underlying local structure to the de-noise imaged data, generating low contrast structure enhanced de-noised image data.

In another aspect, a computing system includes a memory that stores instructions of low contrast structure restoration of de-noised image data, and a processor that receives original image data and de-noised image data, which is the original image data de-noised, and that executes the instructions, which causes the processor to restore low contrast structure to the de-noised image data based on the original image data.

In another aspect, a computer readable storage medium is encoded with computer readable instructions. The computer readable instructions, when executed by a processor, causes the processor to: restore low contrast structure that is lost during de-noising of original image data to de-noised image data based on estimated underlying local structure determined by a difference between the original image data and the de-noised image data.

The invention may take form in various components and arrangements of components, and in various steps and arrangements of steps. The drawings are only for purposes of illustrating the preferred embodiments and are not to be construed as limiting the invention.

Figure 1:
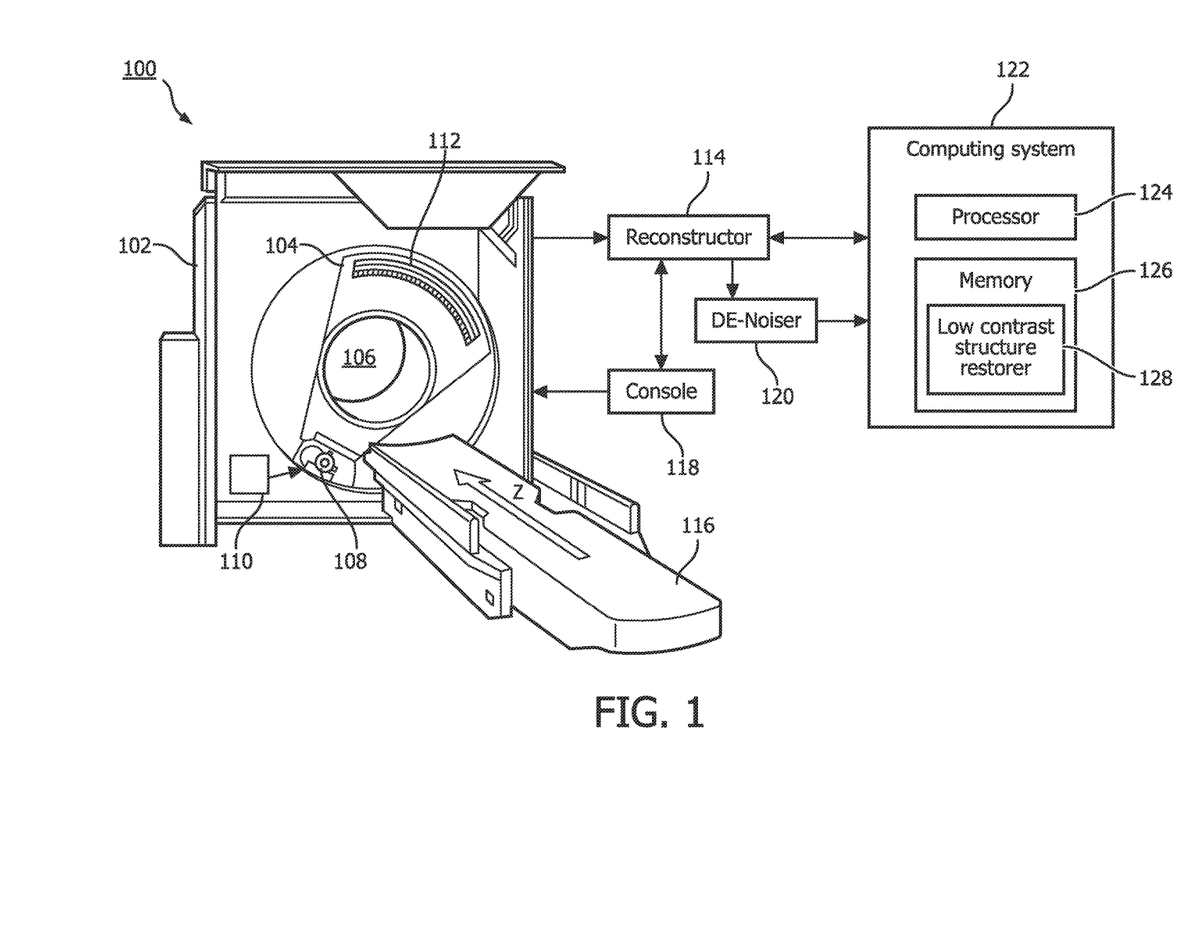
FIG. 1 schematically illustrates an example imaging system in connection with a computing system with a low contrast structure restorer.

Initially referring to FIG. 1, an imaging system 100 such as a computed tomography (CT) scanner is illustrated. Suitable CT scanners include scanners configured for multi-energy (spectral) imaging and scanners configured for only single energy (non-spectral) imaging. A spectral CT scanner is described in this example. The imaging system 100 includes a generally stationary gantry 102 and a rotating gantry 104, which is rotatably supported by the stationary gantry 102 and rotates around an examination region 106 about a z-axis.

A radiation source 108, such as an x-ray tube, is rotatably supported by the rotating gantry 104, rotates with the rotating gantry 104, and emits radiation that traverses the examination region 106. In this example, the imaging system 100 includes a radiation source voltage controller 110, which controls a mean or peak emission voltage of the radiation source 108. In one instance, this includes switching the emission voltage between two or more emission voltages (e.g., 80 and 140 keV, 100 and 120 keV, etc.) within an integration period, between views of a scan, within a view of a scan, and/or otherwise.

A detector array 112 subtends an angular arc opposite the examination region 106 relative to the radiation source 108. The detector array 112 detects radiation that traverses the examination region 106 and generates projection data indicative thereof. Where the scan is a multiple energy scan and the radiation source voltage is switched between at least two emission voltages for the scan, the detector array 112 generates projection data (also referred to as a sinogram) for each of the radiation source voltages. The detector array 112 outputs the projection data.

The illustrated imaging system 100 utilizes kVp switching for multi-energy scanning. In a variation, the imaging system 100 additionally or alternatively includes at least two radiation sources 108 that emit radiation at two different emission voltages to produce spectral projection data. In another variation, the imaging system 100 the detector array 112 additionally or alternatively includes an energy-resolving detector (e.g., multi-layered, photon counting, etc.) that produces spectral projection data. In another variation, the imaging system 100 includes a combination of the above and/or other approach.

A reconstructor 114 decomposes the projection data into various energy dependent components such as a photo-electric component, a Compton component and/or a K-edge component(s) representative of a K-edge material(s), e.g., in a contrast agent. A maximum likelihood and/or other decomposition technique may be used. The reconstructor 114 reconstructs one or more of the components to generate spectral image data at one or more energy levels and/or conventional (non-spectral) image data over the entire spectrum, generating volumetric image data indicative the examination region 106.

A couch or subject support 116 supports a subject or object in the examination region 106. An operator console 118 includes a human readable output device such as a monitor and an input device such as a keyboard, mouse, etc. Software resident on the operator console 118 allows the operator to interact with and/or operate the imaging system 100 via a graphical user interface (GUI) or otherwise. This may include selecting a multi-energy spectral imaging protocol in which the emission voltage is switched between two or more emission voltages.

A de-noiser 120 de-noises (i.e., reduces noise in) the original image data, generating de-noised (i.e., reduce noised) image data. In general, any de-noising approach can be utilized to de-noise the original image data. Examples of suitable de-noising algorithms are described in international patent application PCT/IB2012/051266, filed on Mar. 16, 2012, entitled "Contrast-dependent resolution image," and assigned to Koninklijke Philips Electronics N.V., and international patent application PCT/IB2012/056342, filed on Nov. 12, 2012, entitled "Image domain de-noising," and assigned to Koninklijke Philips Electronics N.V., the entireties of which are incorporated herein by reference.

A computing system 122 includes at least one processor 124 (e.g., a microprocessor, a central processing unit, etc.) that executes at least one computer readable instruction stored in computer readable storage medium ("memory") 126, which excludes transitory medium and includes physical memory and/or other non-transitory medium. The microprocessor 124 may also execute one or more computer readable instructions carried by a carrier wave, a signal or other transitory medium. The computing system 120 can be part of the operator console 118 and/or other computing system.

The at least one computer readable instruction includes a low contrast structure restorer module 128, which is employed to process the de-noised image data based on the original image data. This processing can improve low contrast structure preservation in the de-noised image data, generating subsequent de-noised image data in which the underlining low contrast structures are better preserved, relative to the de-noised image data. As described in greater detail below, the processing analyzes differences between the de-noised and the original image data, and, based on this analysis, improves the preservation of low contrast structures of the de-noised image data.

The subsequent de-noised image data can be further processed, displayed via a display monitor, filmed, archived in a data repository (e.g., a picture archiving and communication system or PACS, an electronic medical record or EMR, a radiology information system or RIS, a hospital information system or HIS, etc.), and/or otherwise utilized.

Figure 2:
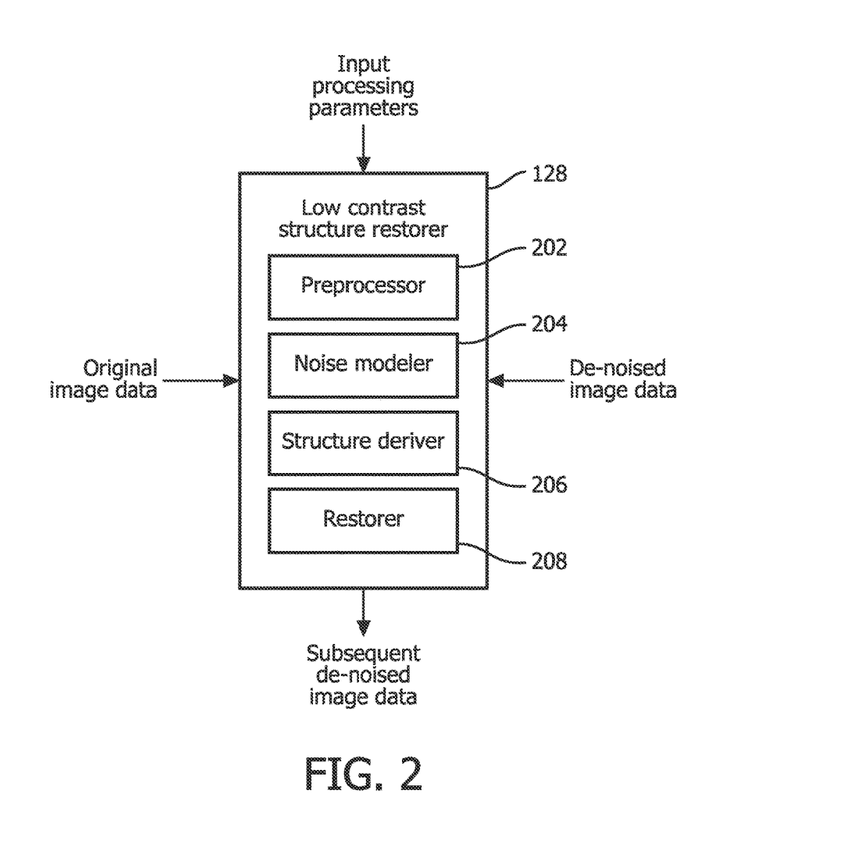
FIG. 2 schematically illustrates an example of the low contrast structure restorer.

FIG. 2 schematically illustrates an example of the low contrast structure restorer module 128.

The low contrast structure restorer module 128 receives as input the original image data, the de-noised image data, and input processing parameters. Again, the de-noised image data is generated by de-noising the original image data. The input processing parameters can include default values, user specified values, and/or other values which may influence the low contrast structure restoration.

The low contrast structure restorer module 128 includes a pre-processor 202. The pre-processor 202 pre-processes at least one of the input original image data or the input de-noised image data. In this example, the pre-processor 202 pre-processes both the input original image data and the input de-noised image data based on at least one of the input processing parameters.

By way of non-limiting example, in one instance the input processing parameters can include a targeted preservation improvement level for the low contrast structures. In this example, the original image data V and the de-noised image data $\overline{V}$ are scaled down to the targeted scale level. The output of the pre-processor 202 includes scaled original image data $V^s$ and scaled de-noised image data $\overline{V^s}$.

The low contrast structure restorer module 128 further includes a noise modeler 204. The noise modeler 204 evaluates the scaled original image data $V^s$ and generates a model of a noise pattern of the scaled original image data $V^s$.

The noise modeler 204 can estimate the noise pattern using noise modelling approaches such as a Monte Carlo estimate, an analytical approach, a direct extraction approach, and/or other approach.

Examples of direct extraction approaches are described in patent application Ser. No. 61/264,340, filed Nov. 25, 2009, and entitled "ENHANCED IMAGE DATA/DOSE REDUCTION," and application Ser. No. 61/286,477, filed Dec. 15, 2009, and entitled "ENHANCED IMAGE DATA/DOSE REDUCTION," which are incorporated herein by reference in their entireties. Other approaches are also contemplated herein.

The low contrast structure restorer module 128 further includes a structure deriver 206. The structure deriver 206 utilizes the noise model to estimate underlying local structures of the object of interest in the original image data. The estimate may improve the local contrast to noise ratio (CNR) of the reference original image data, which facilitates estimating the structures and enables a very accurate structure estimate.

For the estimate, the structure deriver 208 may utilize various algorithms such as bilateral filtering, diffusion filtering, total variation de-noising, mean shifting, and/or other approach. Examples of such algorithms are discussed respectively in Comaniciu et al., "Mean shift: a robust approach toward feature space analysis," IEEE PAMI 2002; Alvarez et al., "Energy selective reconstructions in X-ray computerized tomography", Phys. Med. Biol. 21, pp. 733-744 (1976); Wunderlich et al., "Image Covariance and Lesion Detectability in Direct Fan-Beam X-Ray Computed Tomography", Phys. Med. Biol. 53 (2008), 2472-2493, and patent application Ser. No. 61/264,340.

By way of non-limiting example, the following describes an approach using a bilateral algorithm with spike noise suppression and a two iteration scheme, which may improve performance for higher noise level cases. In a variation, more iterations (e.g., 3, 5, 10, etc.) are utilized. A 3D spatial Gaussian kernel $w^{spatial}$ with standard deviation $\sigma_{spatial}$, i.e., $w^{spatial}_{i',j',k'}$ is generated based on EQUATION 1:

$$w^{spatial}_{i',j',k'} = \sqrt{\exp\left(-\frac{((i'dx)^2 + (j'dx)^2 + (k'dz)^2)}{2\sigma^2_{spatial}}\right)}, \quad \text{EQUATION 1}$$

where dx is a size of a pixel (e.g., in millimeters (mm)), dz is a slice width (e.g., in mm) and $\sigma_{spatial}$ is an algorithm parameter that controls an aggressiveness of the weights.

The structure deriver 208, for each voxel $V^s_{i,j,k}$ in the volume $V^s$, extracts a sub-volume of n voxels around voxel $V^s_{i,j,k}$. The structure deriver 208 then calculates a kernel $w^{range}$ as shown in EQUATION 2:

$$w^{range}_{i',j',k'} = \exp\left(-\frac{(V^s_{i,j,k} - V^s_{i+i',j+j',k+k'})^2}{2(\alpha\sigma^{Noise}_{i,j,k})^2}\right), \quad \text{EQUATION 2}$$

where α is a parameter that controls an aggressiveness of the weights and $\sigma^{Noise}_{i,j,k}$ is a local noise level estimate of $V^s_{i,j,k}$ estimated in the noise modelling above. The structure deriver 208 then multiplies the local kernel by the spatial kernel $w_{i',j',k'} = w^{spatial}_{i',j',k'} w^{range}_{i',j',k'}$ and normalizes to have a sum equal to one.

For spike noise suppression, if the central weight $w_{i',j',k'} > w_{Threshold}$ and $\alpha < \alpha_{max}$, then $\alpha = \alpha * \alpha_{mult}$, and the local kernel is calculated again, multiplied by the spatial kernel, and normalized. The spike suppressed image data is estimated as shown in EQUATION 3:

$$\hat{V}^s_{i,j,k} = \frac{\sum_{i'=-n}^{n}\sum_{j'=-n}^{n}\sum_{k'=-n}^{n} V^s_{i+i',j+j',k+k'} w_{i',j',k'}}{\sum_{i'=-n}^{n}\sum_{j'=-n}^{n}\sum_{k'=-n}^{n} w_{i',j',k'}}. \quad \text{EQUATION 3}$$

The original image data is then processed again, where this time the structures are derived from the spike suppressed image data. For this, the structure deriver 208, for each voxel $V^s_{i,j,k}$ in the volume $V^s$ extract a sub-volume of n voxels around voxel $V^s_{i,j,k}$. The structure deriver 208 then calculates a kernel $w^{range}$ as shown in EQUATION 4:

$$w^{range}_{i',j',k'} = \exp\left(-\frac{(\hat{V}^s_{i,j,k} - \hat{V}^s_{i+i',j+j',k+k'})^2}{2(\beta\sigma^{Noise}_{i,j,k})^2}\right), \quad \text{EQUATION 4}$$

where β is an algorithm parameter that controls an aggressiveness of the weights. The structure deriver 208 then multiplies a local kernel by a spatial kernel $w_{i',j',k'} = w^{spatial}_{i',j',k'} w^{range}_{i',j',k'}$ and normalizes $w_{i,j,k}$ to have a sum equal to one.

The resulting image data is estimated as shown in EQUATION 5:

$$\tilde{V}^s_{i,j,k} = \frac{\sum_{i'=-n}^{n}\sum_{j'=-n}^{n}\sum_{k'=-n}^{n} V^s_{i+i',j+j',k+k'} w_{i',j',k'}}{\sum_{i'=-n}^{n}\sum_{j'=-n}^{n}\sum_{k'=-n}^{n} w_{i',j',k'}}, \quad \text{EQUATION 5}$$

to ensure preservation of low contrast structures, the resulting image data low frequencies are replaced by the original image data low frequencies as: $\tilde{V}^s = \tilde{V}^s - LP(\tilde{V}^s) + LP(V^s)$, where LP is a low pass filter.

The low contrast structure restorer module 128 further includes a restorer 208. The restorer 208 restores the low contrast structures in the de-noised image data. In one instance, this is achieved by analyzing the structures in the difference image data between the original image data and the de-noised image data.

The restorer 208, for each voxel $\tilde{V}^s_{i,j,k}$ in the volume $\tilde{V}^s$ extracts a sub-volume of n voxels around voxel $\tilde{V}^s_{i,j,k}$. The restorer 208 further calculates a kernel $w^{range}$ as shown in EQUATION 6:

$$w^{range}_{i',j',k'} = \exp\left(-\frac{(\tilde{V}^s_{i,j,k} - \tilde{V}^s_{i+i',j+j',k+k'})^2}{2(\gamma\sigma^{Noise}_{i,j,k})^2}\right), \quad \text{EQUATION 6}$$

where γ is an algorithm parameter that controls an aggressiveness. The restorer deriver 208 then multiplies the local kernel by a spatial kernel $w_{i',j',k'} = w^{spatial}_{i',j',k'} w^{range}_{i',j',k'}$ and normalize $w_{i,j,k}$ to have a sum equal to one.

The low contrast structures that were degraded are estimated as shown in EQUATION 7:

$$\tilde{V}^s_{i,j,k} = \frac{\sum_{i'=-n}^{n}\sum_{j'=-n}^{n}\sum_{k'=-n}^{n}(V^s_{i+i',j+j',k+k'} - \overline{V}^s_{i+i',j+j',k+k'})w_{i',j',k'}}{\sum_{i'=-n}^{n}\sum_{j'=-n}^{n}\sum_{k'=-n}^{n}w_{i',j',k'}},$$

EQUATION 7 the final improved image data is obtained by adding back the low contrast structures as: $V^{En} = \overline{V} + US(\tilde{V}^s)$, where US is an up-scale operator.

Figure 3:
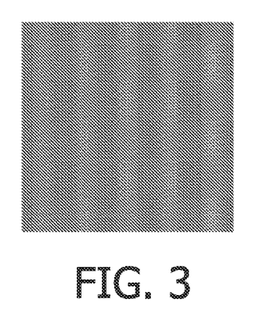
FIG. 3 illustrates original image data.
Figure 4:
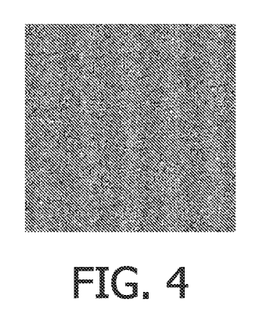
FIG. 4 illustrates the original image data with added noise.
Figure 5:
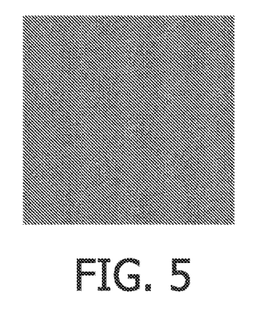
FIG. 5 illustrates resulting image data after applying a bilateral algorithm over the original image data with the added noise.
Figure 6:
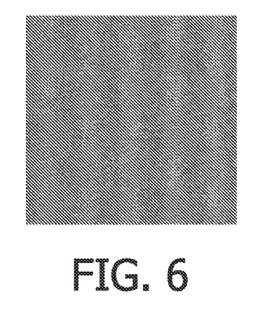
FIG. 6 illustrates resulting image data after applying the approach described herein.
Figure 7:
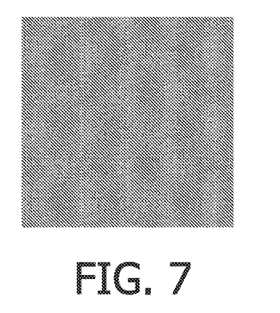
FIG. 7 illustrates difference image data between the bilateral image data and the original image data.
Figure 8:
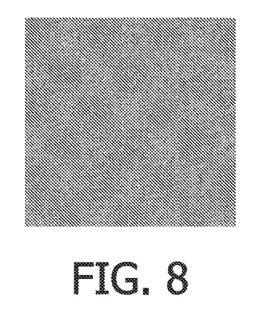
FIG. 8 illustrates difference the image data between the image data created using the approach described herein and the original image data.

Example results are shown in FIGS. 3, 4, 5, 6, 7, 8, 9, 10, 11, 12 and 13. FIG. 3 shows original image data. FIG. 4 shows the original image data with added noise. FIG. 5 shows a result of a bilateral algorithm over the noisy image data of FIG. 4. FIG. 6 shows a result of the approach described herein. FIG. 7 shows difference image data between the bilateral image data and the original image data. FIG. 8 shows difference the image data created using the approach described herein and the original image data.

Figure 9:
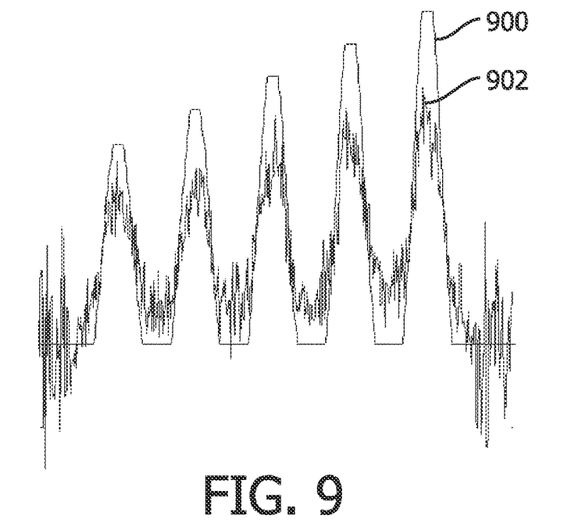
FIG. 9 graphically shows a first profile of the original image data without noise and a second profile of the bilateral image data.
Figure 10:
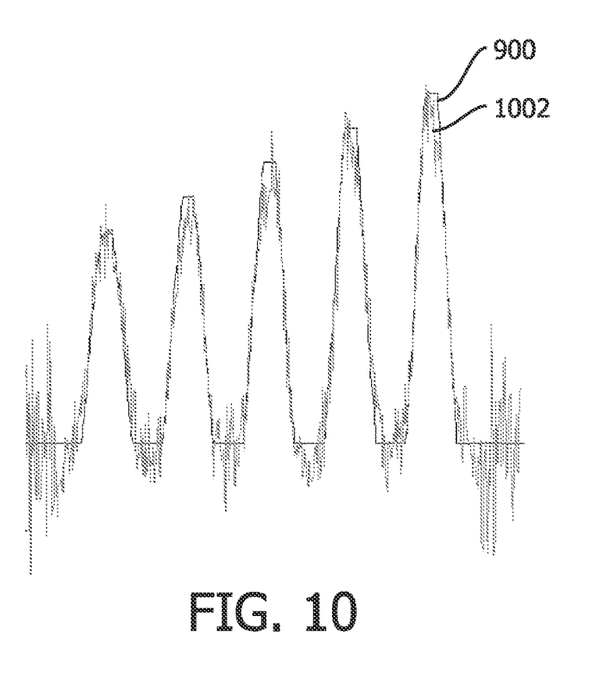
FIG. 10 graphically shows the first profile of the original image data without noise and a third profile of the image data created using the approach described herein.

FIG. 9 graphically shows a first profile 900 of the original image data without noise and a second profile 902 of the bilateral image data. FIG. 10 graphically shows the first profile 900 of the original image data without noise and a third profile 1002 of the image data created using the approach described herein. From FIGS. 9 and 10, the third profile 1002 of the image data created using the approach described herein is closer to the first profile 900 of the original image data, relative to the second profile 902 of the bilateral image data.

Figure 11:
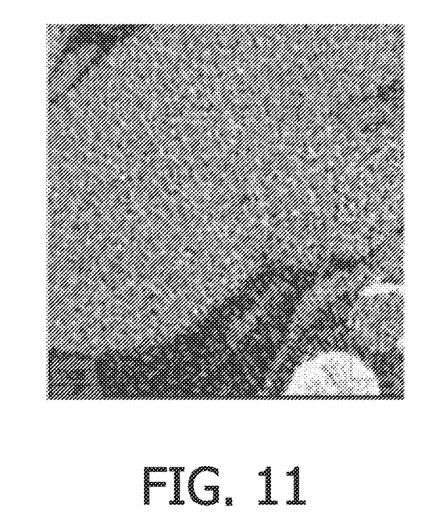
FIG. 11 shows a monochromatic 50 keV image original image.
Figure 12:
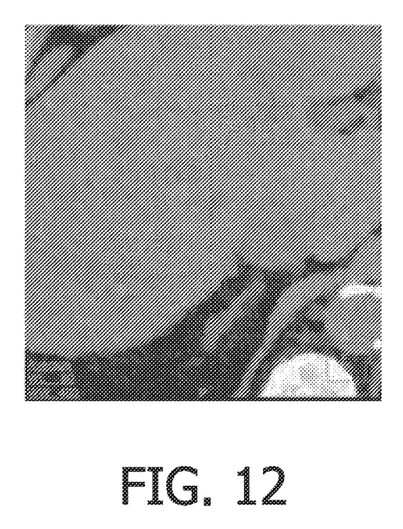
FIG. 12 shows a de-noised image.
Figure 13:
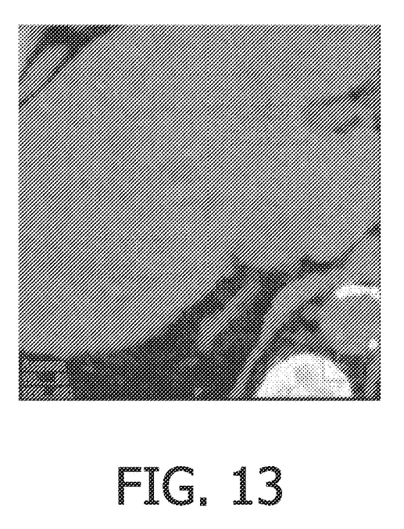
FIG. 13 shows a de-noised image using the approach described herein.

FIG. 11 shows a monochromatic 50 keV image original image. FIG. 12 shows a de-noised image. FIG. 13 shows a de-noised image using the approach described herein.

Figure 14:
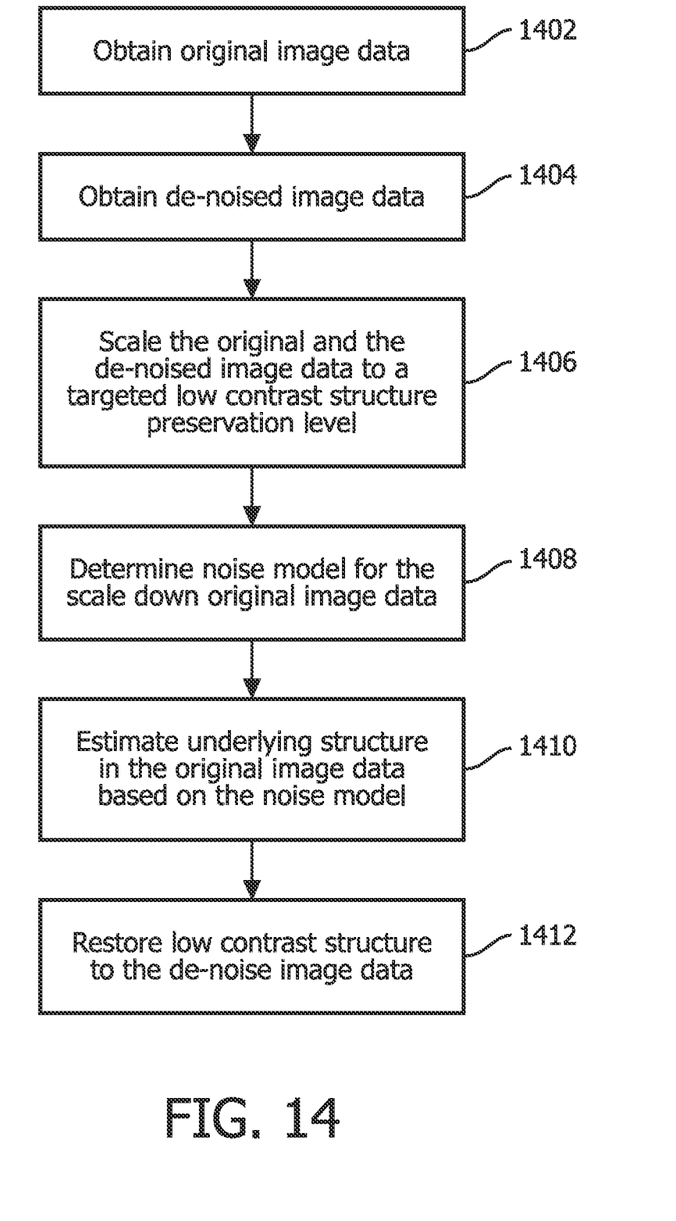
FIG. 14 illustrates an example method in accordance with the disclosure herein.

FIG. 14 illustrates an example method in accordance with the disclosure herein.

It is to be appreciated that the ordering of the acts is not limiting. As such, other orderings are contemplated herein. In addition, one or more acts may be omitted and/or one or more additional acts may be included.

At 1402, original image data is obtained. The original image data is obtained can be obtained from an imaging system (e.g., the imaging system 100 and/or other imaging system) and/or a data repository.

At 1404, de-noised image data is obtained. The de-noised image data is obtained can be obtained from a de-noiser (e.g., the de-noiser 120 and/or other de-noiser) and/or a data repository. The de-noise image data is the original image data, de-noised.

At 1406, the original image data and the de-noise image data are scaled down to a targeted low contrast structure preservation level.

At 1408, a noise model for the scaled original image data is determined.

At 1410, underlying local structure from the original image data is estimated based on the noise model.

At 1412, the low contrast structures are restored in the de-noised image data.

The restored projection data and/or the restore image data can be further processed, displayed via a display monitor, filmed, archived in a data repository, and/or otherwise utilized.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
    obtaining original image data;
    obtaining de-noised image data, wherein the de-noised image data is the original image data after de-noising the original image data;
    determining a noise pattern for the original image data;
    estimating underlying local structure from the original image data based on the noise pattern;
    restoring low contrast structure that is lost during the de-noising of the original image data to the de-noised image data based on the estimated underlying local structure by adding the estimated underlying local structure to the de-noised imaged data, thereby generating low contrast structure enhanced de-noised image data; and
    scaling the original image data and the de-noised image data to a targeted low contrast structure preservation level; and
    determining the noise pattern for the scaled original image data;
    wherein the estimating of the underlying local structure from the original image data based on the noise pattern, comprising:
        generating a spatial kernel for the original image data; and
        for each voxel of the scaled original image data:
            extracting a sub-volume of voxels around a voxel;
            calculating a local kernel based on the scaled original image data;
            multiplying the local kernel by the spatial kernel; and
            normalizing the product of the local kernel and the spatial kernel.

2. The method of claim 1, further comprising:
    estimating the underlying local structure from the original image data based on the noise pattern using iterative bilateral filtering with spike noise suppression.

3. The method of claim 1, the estimating of the underlying local structure from the original image data based on the noise pattern, further comprising:
    comparing the normalized product of the local kernel and the spatial kernel with a predetermined threshold; and
    spike suppressing the voxel only in response to the normalized product being greater than the predetermined threshold.

4. The method of claim 3, the estimating of the underlying local structure from the original image data based on the noise pattern, further comprising:
    calculating a subsequent local kernel based on the spike suppressed scaled image data;
    multiplying the subsequent local kernel and the spatial kernel; and
    normalizing the product of the subsequent local kernel and the spatial kernel.

5. The method of claim 4, further comprising:
    estimating the voxel data based on the scaled image data and the normalized product of the subsequent local kernel and the spatial kernel; and replacing low frequency image data of the estimated image data with corresponding low frequency image data of the original image data, generating estimated scaled original image data.

6. The method of claim 5, the restoring of the low contrast structure, comprising:
for each voxel of the estimated scaled original image data:
extracting a sub-volume of voxels around a voxel;
calculating a local kernel based on the estimated scaled original image data
multiplying the local kernel by spatial kernel; and
normalizing the product of the local kernel and the spatial kernel.

7. The method of claim 4, further comprising:
normalizing the product of the subsequent local kernel and the spatial kernel to have a sum equal to one.

8. The method of claim 5, further comprising:
estimating the low contrast structure degraded during the de-noising of the original image data based on the scaled original image data, the estimated scaled original image data and the normalized product of the subsequent local kernel and the spatial kernel; and
adding the estimated low contrast structure to the de-noised image data, thereby generating the low contrast structure enhanced de-noised image data.

9. The method of claim 1, further comprising:
modeling the noise pattern of the original image data based on a Monte Carlo estimate or an analytical approach.

10. The method of claim 1, further comprising:
estimating the underlying local structure from the original image data based on the noise pattern using at least one of diffusion filtering, total variation de-noising, or mean shifting.

11. A computing system, comprising:
a memory that stores instructions of low contrast structure restoration of de-noised image data; and
a processor that receives original image data and de-noised image data, which is the original image data de-noised, and that executes the instructions, which causes the processor to restore low contrast structure to the de-noised image data based on the original image data by:
scaling the original image data and the de-noised image data to a predetermined targeted low contrast structure preservation level;
determining a noise pattern for the scaled original image data;
estimating underlying local structure in the original image data based on the noise pattern by:
generating a spatial kernel for the original image data; and
for each voxel of the scaled original image data:
extracting a sub-volume of voxels around a voxel;
calculating a local kernel based on the scaled original image data;
multiplying the local kernel by the spatial kernel;
normalizing the product of the local kernel and the spatial kernel;
comparing the normalized product with a predetermined threshold; and
spike suppressing the voxel only in response to the normalized product being greater than the predetermined threshold; thereby restoring the low contrast structure with the estimated underlying local structure.

12. The computing system of claim 11, wherein the processor estimates the underlying local structure by:
calculating a subsequent local kernel based on the spike suppressed scaled image data;
multiplying the subsequent local kernel and the spatial kernel;
normalizing the product of the subsequent local kernel and the spatial kernel;
estimating the voxel data based on the scaled image data and the normalized product of the subsequent local kernel and the spatial kernel; and
replacing low frequency image data of the estimated image data with corresponding low frequency image data of the original image data, generating estimated scaled original image data.

13. The computing system of claim 12, the processor, in response to executing the instructions, further: restores the low contrast structure lost during the de-noising of the original image data to the de-noised image data.

14. The computing system of claim 13, wherein the processor estimates the underlying local structure by:
for each voxel of the estimated scaled original image data:
extracting a sub-volume of voxels around a voxel;
calculating a local kernel based on the estimated scaled original image data;
multiplying the local kernel by spatial kernel; and
normalizing the product of the local kernel and the spatial kernel.

15. The computing system of claim 14, wherein the processor estimates the underlying local structure by:
estimating the low contrast structure degraded during the de-noising of the original image data based on the scaled original image data, the estimated scaled original image data and the normalized product of the local kernel and the spatial kernel; and
adding the estimated low contrast structure to the de-noised image data, thereby generating the low contrast structure enhanced de-noised image data.

* * * * *